United States Patent

[11] 3,607,800

| [72] | Inventor | Kazys Sekmakas |
| | | Chicago, Ill. |
| [21] | Appl. No. | 801,783 |
| [22] | Filed | Feb. 24, 1969 |
| [45] | Patented | Sept. 21, 1971 |
| [73] | Assignee | De Soto, Inc. |
| | | Des Plaines, Ill. |

[54] WATER-DISPERSIBLE POLYURETHANE RESINS
13 Claims, No Drawings

[52] U.S. Cl. .................................................... 260/18 PT,
204/181, 260/18 TN, 260/29.2 TN
[51] Int. Cl. ................................................................C08g 41/00,
C08j 1/46
[50] Field of Search ........................................... 260/18 TN,
77.5 AM, 77.5 AN, 77.5 AP, 858

[56] References Cited
UNITED STATES PATENTS

| 2,921,866 | 1/1960 | Wilson ......................... | 117/98 |
| 3,397,160 | 8/1968 | Hicks ........................... | 260/18 |
| 3,461,103 | 8/1969 | Keberle et al. ................ | 260/75 |
| 3,464,939 | 9/1969 | Van Westrenen ............. | 260/22 |

FOREIGN PATENTS

| 1,526,939 | 5/1968 | France ......................... | 260/18 |

*Primary Examiner*—Donald E. Czaja
*Assistant Examiner*—Eugene C. Rzucidlo
*Attorney*—Dressler, Goldsmith, Clement & Gordon

ABSTRACT: Water-dispersible polyurethane resins are provided by reacting a resinous polyol with a stoichiometric deficiency of polyisocyanate to provide an hydroxy-functional polyurethane in which carboxyl functionality is generated with a portion of the carboxyl functionality being preferably consumed by reaction with monoepoxide to generate hydroxy ester groups.

WATER-DISPERSIBLE POLYURETHANE RESINS

The present invention relates to polyurethane resins which are dispersible in water with the aid of a base and which are produced by the reaction of a resinuous polyol with a stoichiometric deficiency of polyisocyanate to provide an hydroxy-functional polyurethane, a portion of the hydroxy groups of this polyurethane being consumed by reaction with a polycarboxylic acid monoanhydride in order to generate carboxyl functionality in the resin.

While the main thrust of the invention is broadly in the direction of water dispersible resins, the invention includes numerous features of importance including reaction procedures which enable conventional epoxy resins to be utilized as starting materials, and the inclusion of frosting oil fatty acids which enable curing temperatures to be minimized and even to permit cures in the absence of any extraneous curing agent. The invention still further includes polyurethane resins which have been so modified as to enable aqueous dispersions containing the same to be employed in electrocoating processes in which a unidirectional electrical current is passed through the aqueous bath containing the dispersed resin to cause the resin to deposit at the anode of the system.

The present invention starts by utilizing a resinuous polyol which, in the preferred instance, is produced by reaction of a resinuous polyepoxide with a stoichiometric proportion of monocarboxylic acid which is preferably a drying oil fatty acid and most preferably a frosting oil fatty acid, the stoichiometry being between the carboxyl groups of the acid and the epoxy groups of the resinuous polyepoxide. In this way, a resinuous polyhydric alcohol is provided by a relatively low temperature reaction which may be used to introduce drying unsaturation.

It should be noted immediately that when the drying unsaturation is highly reactive as its typical of frosting oil fatty acids such as tung oil and china wood oil, the resins which include such highly reactive unsaturation have a strong tendency to gel during the further processing of the resin unless such further processing is carried out at a low reaction temperature. In this connection, simple addition reaction temperature. In this connection, simple addition reactions can frequently be handled at temperatures which will not gel frosting oil fatty said esters whereas condensation reactions generally require far higher reaction temperatures which could not be permitted if any significant proportion of frosting oil component was present.

As will be evident, the acid-epoxy reaction is an addition reaction which forms an hydroxy ester so that, if the resinuous polyepoxide does not contain hydroxy groups prior to reaction with the fatty acid, then such hydroxy groups are generated by the reaction. More generally, the resinuous polyepoxide will include hydroxy functionality prior to reaction with fatty acid and such reaction generates further groups to add to the available hydroxy functionality in the resin.

As will be apparent hereinafter, the molecular weight of the starting resinuous polyepoxide will be considerably enhanced by subsequent reactions and it is intended that the product ultimately be dispersed in water. Thus, the resinuous polyol should possess limited molecular weight. From the standpoint of resinuous polyepoxides which one be utilized, these may have a molecular weight in the range of from about 300 to about 4,000, but preferably have a molecular weight of from 400 to 2,000. These are preferably diglycidyl ethers of bisphenols such as bisphenol A and include a significant hydroxy functionality in addition to a 1,2-epoxy equivalency of 1.2 or greater. The preferred materials have an epoxy equivalency of from 1.4 to 2.0.

Continuing with the resinous polyol (epoxy ester) which has been formed by reaction of the starting resinuous polyepoxide with drying fatty acid, this resinuous polyol can then be treated utilizing steps, the order of which are subject to considerable variation, but one essential step which is a reaction with a stoichiometric deficiency of organic polyisocyanate. The purpose is to extend the chain of the resinous polyol through urethane formation and to provide in this way an hydroxy-functional polyurethane.

The reaction of organic polyisocyanate which is preferably constituted by organic diisocyanate, is a low temperature addition reaction which can be carried out to completely consume the isocyanate functionality without gelling any unsaturated component which may have already been introduced. The point is that if the proportion of organic polyisocyanate is small, the stoichiometric excess of hydroxy functionality in the resinuous polyol will enable the reaction to proceed without gelation and, of course, the polyurethane which is produced includes hydroxy functionality which is then available for reaction.

It is permissible to react a portion of these available hydroxy groups either before or after reaction with polyisocyanate to provide the hydroxy-functional polyurethane. The point is to minimize the tendency to either gel the resin through any cross-linking reaction involving the added acid groups and, at the same time, to avoid reaction temperatures which can cause the resin to gel through the different mechanism of polymerization involving the unsaturation of the drying oil fatty acid component.

The foregoing is accomplished by employing a polycarboxylic acid monoanhydride typically illustrated by trimellitic anhydride. The single monoanhydride group will react with the available hydroxy functionality at low temperature which will not affect any unsaturation which may be present and which also leaves unreacted the carboxyl functionality introduced and the remaining hydroxy groups.

It is to be observed that the isocyanate functionality of the organic polyisocyanate is preferentially reactive with the hydroxy functionality in the resinuous polyol so that, if the carboxyl functionality is introduced prior to reaction with polyisocyanate, this carboxyl functionality remains largely undisturbed by the small proportion of polyisocyanate which is utilized. Correspondingly, the same reaction with polycarboxylic acid monoanhydride can be carried out after the polyisocyanate has been utilized to provide the hydroxy-functional polyurethane. In either event, the hydroxy-functional polyurethane has a portion of its hydroxy groups consumed by reaction with the polycarboxylic acid monoanhydride in order to provide the desired carboxyl functionality.

As an interesting variation, a portion of the monoacid utilized to consume the epoxy functionality of the resinous polyepoxide may be replaced by a polycarboxylic acid, and especially by dicarboxylic acids in order to increase the molecular weight of the starting polyepoxide. Thus saturated dicarboxylic acids such as succinic acid or adipic acid may be used and unsaturated dicarboxylic acids such as maleic acid or fumaric acid can also be used.

The foregoing reactions provide a hydroxyl-functional polyurethane resin having an epoxy resin backbone, drying functionality (if low temperature cure is desired) and a small proportion of carboxyl functionality. While these resins are dispersible in water with the aid of a base, they are not entirely satisfactory for electrodeposition and, moreover, they do not have the easy water dispersibility which is preferred. For this purpose, more carboxyl functionality is added by reaction with the monoanhydride as previously indicated than it is desired to have in the final product and excess acidity is consumed by reaction with a monoepoxide. Again, the reaction is an addition reaction which can be carried out a at a low temperature without gelling the resin.

The final product includes the residual hydroxy functionality derived from the resinuous polyol, the carboxyl functionality which has not been consumed by reaction with monoepoxide and, additionally, there will be hydroxy functionality in a terminal position with respect to the polymer molecule introduced by the reaction with the monoepoxide which, as is well known, produces an hydroxy ester upon reaction with acid.

For electrocoating purposes, it is preferred that the final acid value be less than 50 and it is preferably less than 30. Indeed, the most preferred acid values are from about 8 to about 25.

The starting material utilized in the present invention is a resinous polyol which is preferably an epoxy ester, but other resinous polyols may be used. These are illustrated particularly by relatively low molecular weight solution copolymers containing copolymerized ethylenically unsaturated alcohol such as allyl alcohol or hydroxyethyl methacrylate or other similar ethylenically unsaturated hydroxy compounds. The balance of the copolymer is preferably constituted by monoethylenic monomers and especially those containing a single

group, it being preferred to employ monovinyl aromatic compounds such as styrene or vinyl toluene or $C_1$–$C_4$ esters of monoethylenic carboxylic acids such as acrylic acid.

When particular reference is made to addition copolymers, especial attention is directed to copolymers of styrene or the like with allyl alcohol as illustrated by a copolymer containing 6 percent by weight of the hydroxy group and low molecular weight copolymers of styrene and maleic anhydride which may contain from 1 to 5 or even more moles of styrene per mole of maleic anhydride and which have been hydrolyzed or half esterified by reaction with a $C_1$–$C_4$ alcohol in order to provide free acid groups which can be consumed by reaction with monoepoxide to generate an hydroxy derivative. The monoepoxides which are useful for this purpose are illustrated by ethylene oxide, propylene oxide, butylene oxide or glycidyl esters of monocarboxylic acids, especially tertiary carboxylic acids such as Versatic Acid.

The relatively low molecular weight copolymers which are preferred are normally produced using solution copolymerization which is entirely convention. Since ultimate dispersion in water is desired, the solvent used for copolymerization is preferably water miscible and inert with respect to the various reactants contemplated herein. Ketones such as methyl ethyl ketone and 2-ethoxy ethanol acetate will illustrate useful solvents which may ultimately be carried into the aqueous dispersions which are formed. Even when organic solvent is not present in the preparation of the resinous polyol, it is desirable used in the modification thereof, and the same basis for selecting the solvent applies.

Referring to the preferred resinous polyols which are epoxy esters, these are preferably based on diepoxides as has been discussed hereinbefore, which are reacted with fatty acid in approximately stoichiometric proportion based on the epoxy group so as to consume all of the epoxy functionality which is available. It is also intended that the product not include any large proportion of free acidity and acid numbers of less than 20 are desirable, preferably less than 10. The specific nature of the monocarboxylic acid which is employed is of secondary significance and, indeed, a proportion of polycarboxylic acid may be present as has been discussed hereinbefore. While drying properties are frequently desired so that drying oil fatty acids including semidrying alcohol fatty acids and frosting oil fatty acids are preferred, the presence or absence of unsaturation is not a crucial aspect of the invention with the exception of the unusual capacity of the invention to employ frosting oil fatty acids as has been noted. Typical fatty acids which may be employed are butyric acid, hexoic acid, dehydrated castor oil fatty acids, castor oil fatty acids, linseed fatty acids and tall oil fatty acids.

As previously indicated, the resinous polyol starting material is subjected to several reactions, the order of which can be varied considerably. In this sequence of reactions, one important reactant is organic polyisocyanate, preferably constituted by organic diisocyanates. This class of materials is well known and is illustrated by the conventional toluene diisocyanates including mixed isomers thereof, but the invention preferably employs aliphatic diisocyanates.

Any aliphatic diisocyanate may be used in the practice of this invention. Preferably the aliphatic portion of the compound is a divalent hydrocarbon radical containing at least 6 carbon atoms, preferably more than 10 carbon atoms. The hydrocarbon group may be straight, branched, or cyclic since all of these are useful in the practice of the invention. The diisocyanates are particularly preferred since higher functional compounds are troublesome with respect to gelatin and water dispersibility, but can be used in small amount if care is taken.

Examples of aliphatic diisocyanates which may be used include dicyclohexane-4,4'-diisocyanate, tetramethylene diisocyanate, hexamethylene diisocyanate, and the like. Especially desirable is 4,4' methylenebis (cyclohexyl isocyanate) which is a cycloaliphatic compound. Also useful are the diisocyanates based on fatty acid dimers such as that produced by dimerizing a C 18 fatty acid to obtain a aliphatic diisocyanate based on a 36 carbon divalent hydrocarbon radical.

The proportion of organic diisocyanate is important. While the invention broadly contemplates the use of up to 20 percent by weight, based on the weight of the resinous polyol, it is preferred that a smaller proportion be used, the preferred proportions on the same basis ranging from 0.25–10 percent by weight. Most preferably, from 0.5–4 percent of diisocyanate is used. Of course, a stoichiometric deficiency of diisocyanate is essential and it is preferred to use a ratio of hydroxy to isocyanate of from 2:1 to 50:1, preferably from 4:1 to 30:1.

When frosting oil fatty acid is used and it is intended to rely on low temperature curing reactions, then one would wish to maximize molecular weight and, for this purpose, larger proportions of diisocyanate should be used in order to extend the chain of the resin to the extent desired. A ratio of hydroxy to isocyanate of less than 15:1 is preferred to maximize resinification.

It is stressed that while small proportions of diisocyanate are contemplated and preferred that these exhibit a considerable effect on the resin which is produced in that toughness and flexibility are significantly enhanced.

The aliphatic diisocyanates are particularly preferred because they contribute superior color properties, but these properties are of limited significance in electrodeposition processes since the metal ions at the anode are entrapped by the deposited coating providing a source of discoloration independent of the resin which is deposited on iron.

The resinous polyols which are produced as described do not include acid groups and, if dispersibility in aqueous alkaline medium an illustration desired, it is necessary to introduce carboxyl functionality. Accordingly, the resinous polyol or the polyurethane produced therefrom is reacted with a polycarboxylic acid anhydride such as trimellitic anhydride. The point is that the acid selected should contain a single-anhydride group and, preferably also, at least one further carboxylic acid group. As a result, the single anhydride group can react with at least a portion of the remaining hydroxy groups to thereby generate a carboxyl group and with no danger of gelation since the single-anhydride group will react easily under conditions under which the carboxyl group is not significantly reactive and which will not disturb any frosting unsaturation which may be present. Using trimellitic anhydride as an illustration, the anhydride group reacts to bind the trimellitic moiety to the polymer and, for each such reaction, there are two carboxyl groups provided in the resin, one being the carboxyl group originally present in the trimellitic anhydride compound and the second being generated by reaction of the anhydride group.

As will be evident, other monoanhydrides such as phthalic anhydride and succinic anhydride may be utilized, but trimellitic anhydride is especially valuable from the standpoint of producing saponification-resistant products which has been made available recently and which can be used in alpha-(2is preferred for this reason and also for the further reason that a single trimellitic anhydride molecule generates a pair of carboxylic acid groups. Still other anhydrides which can be used are maleic anhydride, acetic anhydride, propionic anhydride, and hexanhydrophthalic anhydride. It is to be especially noted that adduction of the maleic moiety to any unsaturation which may optionally be present is not intended since this would gel the product if the anhydride group is also reacted with the hydroxy group. Adduction used alone would not provide the hydrolytic stability in the alkaline bath desired by the invention. A trifunctional monoanhydride -carboxyethyl)-glutaric anhydride.

Sufficient trimellitic anhydride or other anhydride should be utilized to provide an acid number of 5 to 120, but for water application an acid number of at least 15 is desirable. Preferably, the acid number introduced should range from about 20 to about 120 and most preferably of from 50 to 100.

While the use of polycarboxylic acid monoanhydrides is particularly preferred for the reasons noted, it is also possible in certain aspects of the invention to employ an alpha, beta-monoethylenically unsaturated acid such as maleic acid, fumaric acid, or acrylic acid. Here, the acid is incorporated by copolymerization with ethylenic unsaturation introduced with the drying oil fatty acid.

In general the reaction conditions needed for adduction are such that gelling of a frosting oil fatty acid could not be prevented so that the adduction technique is not satisfactory when frosting components are present. Also, stability in aqueous alkaline medium is impaired, but the resins of the invention do not have to be used in aqueous alkaline medium though this is a feature of the invention.

The carboxyl-functional material produced as aforesaid is then reacted with an epoxide, preferably a monoepoxide to reduce the acidity and produce an hydroxy ester. Preferred practice of the invention reduces the acidity to the range of from 12-25 as has been stated, but at least some of the advantage of the invention is achieved to the extent that the monoepoxide is used and to the extent that excessive acidity is consumed thereby. Acid numbers as high as 70 illustrate least preferred practice of the invention when electrodeposition is intended, but it is stressed that there are important features of the invention achieved at acid numbers less than 30 which cannot be practically duplicated at higher acid numbers. The reduced acid values relied upon in the present development not only provide coatings which are far less sensitive to water, but the conductivity of the film is reduced so that excessively thick films are not deposited and it is a feature of the invention to achieve adequate colloidal dispersibility in water with such a low acid number.

While monoepoxides are preferably used, since these are effective to reduce acidity and generate hydroxy groups remote from the polymer backbone with minimum danger of gelation, it will also be appreciated that small amounts of polyepoxide, e.g., a bisphonal-based diepoxide of low molecular weight can be used either alone or in admixture with the monoepoxide. However, the proportion of its use must be restricted to avoid gelation. These remotely positioned hydroxy groups are especially valuable in promoting water dispersibility and compatibility with aminoplast resin, especially water insoluble aminoplast resins.

With respect to the monoepoxide used to generate hydroxy ester groups, any monoepoxide can be used which is free of functional groups which would interfere with the reaction between the carboxy-functional intermediate and the monoepoxide. The preferred monoepoxides are the $C_2-C_4$ monooxides such as ethylene oxide, propylene oxide, and butylene oxide. The low molecular weight aliphatic compounds are superior from the standpoint of water solubility. However, styrene oxide can be used though it is less preferred. Also, higher molecular weight monoepoxides can be used, but these are, again, less preferred.

On the other hand, alpha-branched saturated monocarboxylic acids and especially tertiary fatty acids in the form of a glycidyl ester are quite good and have been found to be of unique value in providing reactive hydroxy esters which are fully compatible with water and which help to provide desirable physical properties in the final resin product. These have the formula:

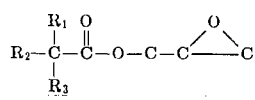

in which $R_1$ and $R_2$ are alkyl radicals having a chain length of from 2-18 carbon atoms and $R_3$ is the same as $R_1$ and $R_2$ or hydrogen. The compound in which $R_1$, $R_2$ and $R_3$ are all alkyl radicals containing from 9-11 carbon atoms is identified as tertiary glycidyl ester A and is used in some of the examples hereinafter.

The reaction with monoepoxide is easily carried out at moderate temperatures and the reaction quickly goes to substantial completion. Appropriate temperatures are in the range of 150°–350° F., preferably from 200°–300° F. Accordingly, the epoxide must be used in stoichiometric deficiency with respect to the acid groups which are available. A small amount of an amine or other alkaline material is advantageously used in order to promote the carboxy-epoxy reaction. Triethylamine, sodium bicarbonate or benzyltrimethyl ammonium chloride are illustrative catalysts. The stoichiometric deficiency is usually at least 5 percent, preferably from 50–90 percent, depending upon the acidity which has been introduced and the desired final acidity. The consumption of the carboxyl groups which have been provided is easily followed by observing the acid number of the product as it is produced.

The final acid value has been discussed previously and should broadly be in the range of about 8 to about 70, with better results being obtained at acid values below 50, and with best results being obtained in the range of from 12-25.

It will be observed that the epoxide reaction generates an hydroxy ester group and that there will be hydroxy functionality remaining from the initial resinous polyol. Products having an hydroxy functionality expressed by an hydroxy number in excess of 30, preferably at least 50, are preferred.

The resins used can be applied clear or pigmented. The examples herein deposit clear films to minimize extraneous factors. In normal practice, these resins are frequently pigmented, the pigment being incorporated in the water free resin solution. Normal pigmentation is illustrated by titanium dioxide rutile incorporated by simple ball milling. A typical pigment to binder ratio is substantially 0.4:1, though this ratio may vary from 0.1:1 to 1:1 or higher, with values of 0.3:1 to 0.5:1 being more usual. The only caution to be observed is to avoid those pigments which are unduly sensitive to water when water application is intended. Corrosion resistant pigments may be used, but this is not essential.

It is desired to point out that the acidic epoxy esters which have been advanced with diisocyanate in accordance with the invention are useful in aqueous alkaline medium or in solvent medium with various curing mechanisms being available. Thus, if a frosting oil has been utilized air drying or low temperature curing characteristics will be available. Even where drying fatty acids are not used, the hydroxy functional materials may be cured with aminoplast resins such as melamine-formaldehyde condensates with the introduced acidity providing an internal catalyst to speed the cure without introducing pigment flocculation problems. Where ordinary drying oil fatty acids are used, the resins can be cured by cross linking them with styrene or similar monomer. While the resins with or without introduction of acidity can be applied from organic solvent medium, the acidity is necessary for water application. However, and to enable hydrophilic systems which are peculiarly adapted for electrophoretic deposition at the anode of a unidirectional electrical system then the acidity is reduced by reaction with monoepoxide as has been described in order to introduce hydroxy groups remote from the polymer backbone and to reduce the acidity to the range preferred.

In order to obtain water application, the carboxyl groups of the resin are reacted with a base, preferably a nitrogenous base such as an amine to provide a pH which may broadly range from about 6 to about 11, but which is preferably in the range of 7.5–10. Dispersion of the carboxyl-functional resin in water with the aid of a base as well as the electrophoretic deposition thereof either alone or together with aminoplast resins which have either been dissolved or dispersed in the aqueous medium is conventional and will not be described at length herein.

The term "aminoplast resins" is a common one used to define heat-hardening condensation products of amines and especially triazines with excess formaldehyde. Condensation products of excess formaldehyde with melamine, benzoguanamine, and urea constitute typical aminoplast resins and the hydroxy esters of the invention exhibit good compatibility with such materials. The condensation reaction, as is well known, is normally carried out in alcoholic solvent medium, such as methanol, ethanol, butanol or higher alcohol. Broadly, the aminoplast helps the cure when used in water soluble or water dispersible form and proportions of 1–50 percent, preferably 5–40 percent, based on total resin, are used to form films which cure more extensively and at lower temperature. Water insoluble aminoplast resins are particularly preferred in accordance with the invention, e.g., benzoguanamine-formaldehyde condensates.

The hydrophylic resins of the invention are desirably utilized in the form of a solution in a water miscible organic solvent, these being preferably used in an amount of at least 12 percent by weight, desirably at least 20 percent by weight of water miscible organic solvent, based on the weight of the resins which are dispersed in the water phase. The preferred solvents are: dioxane, ethanol, isopropanol, 2-ethoxy ethanol, methyl ethyl ketone, 2-epoxy ethanol acetate, propyl alcohol, butoxy ethanol, 2-ethoxy diethylene glycol, 2-butoxy diethylene glycol, etc.

The specific nature of the nitrogenous base which is selected to aid solubility is not primary feature of the invention. Ammonia is a useful nitrogenous base, but aliphatic amines are preferred. These aliphatic amines are illustrated by monomethyl amine, dimethyl amine, diethyl amine, triethyl amine and morpholine. The proportional of the nitrogenous base is determined by the pH which is desired in the electrodeposition bath. Even inorganic bases such as sodium hydroxide are broadly useful though less preferred.

For electrodeposition, it is preferred that the aqueous electrocoating bath contain from 1–20 percent of resin solids, preferably from 5–15 percent by weight.

The films which may be deposited in accordance with the invention are normally baked in order to cure the same. In the presence of frosting oil fatty acids, and especially when the molecular weight of the resin has been advanced by reaction with a proportion of diisocyanate at the higher end of the range set forth then cure becomes practicable at temperatures of the order of 200° F. On the other hand, and where frosting unsaturation is not present, generally higher baking temperatures are required which may range to about 500° F. The presence of an aminoplast resin is also helpful to enable an effective cure at more moderate temperature, e.g., below 350° F.

The invention is illustrated in the following examples.

EXAMPLE 1

Parts by Weight
1,000 Epoxy Resin*

*Polyglycidyl ether of bisphenol A having an epoxy value equivalency per 100 grams of 0.18 and a melting point in the range of 64°–76° C. (1.8 equivalents of epoxide)

535 Tung Oil Fatty Acids (1.8 equivalents of acid)
350 4-Methoxy-4-Methyl-Pentanone-2 (solvent)
2 Triethyl Amine
1 Antioxidant**

**2,6-di-tertiary butyl-4-methyl phenol.

Charge the foregoing into a reactor and set reflux condenser. Heat to 125° C., and hold for an acid value of 3 to 4. No water is separated.

150 Methyl Ethyl Ketone—Add ketone slowly to dilute resin and cool to 100° C.
30 Toluene diisocyanate—Add diisocyanate and hold for one hour at 100–110° C., then cool to 70° C.
0.7 Dibutyl tin oxide—Add tin catalyst and hold for 15 minutes.
75 Trimellitic Anhydride—Add anhydride and reheat to 100° C. Hold for two hours.
25 Triethyl Amine
28 Butylene Oxide—Add triethyl amine and butylene oxide and hold for an acid value of 14 to 18.
100 Ethylene Glycol Monoethyl Ether—Add solvent and cool.

The final characteristics of the resin are as follows:
Solids (percent) 73.9
Viscosity (Gardner-Holdt) $Z_4$–$Z_5$
Acid Value 15.1

EXAMPLE 2

Parts by Weight
1,125 Epoxy Resin*

*Diglycidyl ether of bisphenol A having an epoxide equivalent weight of 250 and a melting point in the range of 20°–28° C. (4.5 equivalents of epoxide)

630 Dehydrated Castor Oil Fatty Acids (2.25 equivalents)
165 Adipic Acid (2.25 equivalents)
1.5 Triethyl Amine Set reflux condenser and charge the foregoing into flask and heat slowly to 150° C. Hold for an acid value of 4–5.

300 Methyl Ethyl Ketone—Add methyl ethyl ketone and cool to 90° C.
20 Toluene Diisocyanate—Add diisocyanate over a 15 minute period and hold for 1 hour.
141 Trimellitic Anhydride—Add anhydride at 90°–100° C. and hold for 2 hours at reflux.
405 Methyl Ethyl Ketone—Add ketone solvent.
35 Triethyl Amine—Add amine
220 Tertiary Glycidyl Ester A—Add over a 30 minute period at 90°–100° C. Hold for an acid value of 19–21.

The final characteristics of the resin are as follows:
Solids (percent) 76.8
Viscosity (Gardner-Holdt) $Z_1$–$Z_2$
Acid Value 20.8

EVALUATION OF THE POLYMER OF EXAMPLE 2

The polymer solution of example 2 was blended with 30 percent by weight of butylated benzoguanamine-formaldehyde condensate. Films of the above coatings were drawn on steel panels and baked 20 minutes at 350° F. The thickness of the films was one mil. The following results were obtained:
Adhesion to metal: Excellent
Pencil harness: 5H
Forward impact: 120 in./lbs.
Flexibility (conical mandrel): Pass one-eighth inch
Toluol resistance: Excellent
Recoat adhesion: Very Good The above results indicate that the coating prepared utilizing urethane resins have excellent cure, hardness, flexibility and adhesion properties.

EXAMPLE 3

Example 2 was repeated using 70 parts of butylene oxide in place of the 220 parts of Glycidyl Ester A, the butylene oxide being added over a 20 minute period while the temperature fluctuated in the range of 95°–105° C. The following are final characteristics of the product.

Solids: 75.7 percent
Viscosity (Gardener) Z–Z$_1$
Acid Value 20.1

A pigmented electrocoat primer was prepared utilizing the urethane resin of example 3. The following procedure was used:

Parts by Weight
100 Titanium Dioxide
50 Resin solution of example 3
184 2-Ethoxy Ethanol Grind pigment in a sand mill until all pigment is dispersed and gives a 7½ North-Shore Gauge fineness reading. To the above pigment dispersion add:

420 Resin Solution of example 3
352 Benzoguanamine Resin (see note 1)
8.4 Antioxidant (2,6-di-tertiary butyl-4-methyl phenol)
52 2-Ethoxy Ethanol
25 Triethyl Amine Mix all ingredients and add 7,400 parts distilled water to provide an aqueous bath containing 10 percent solids.

The pH of the above aqueous bath is 9.8. The coating operation is performed in a steel tank, which is equipped with a recirculating pump and a thermometer. The tank serves as a cathode and zinc phosphate treated steel panels are utilized as the anode. Direct current is imposed on the metal container (cathode) and on the steel panels (anode) from an external circuit. Steel panels 4 inches wide and 8 inches dipped length are used as anodes for coating. The panels are coated at 175 volts to deposit a film, before electrical resistance of the film virtually stops deposition at the maximum voltage used. The deposited film, even before baking, is water resistant, slightly tacky and has very good adhesion to metal.

After baking for 20 minutes at 400° F., the film cures to a solvent resistant, pore-free, hard (6H pencil hardness), and flexible coating.

The above primer exhibits excellent detergent and salt spray resistance. Detergent resistance is determined by immersion of the coated panels in 1 percent aqueous Tide solution. The above primer passes 120 hours of detergent resistance at 130° F. and exhibits no blistering tendencies. It also passes 500 hours of salt spray corrosion testing.

Note 1—The benzoguanamine resin utilized is a heat-hardening, water dispersible (but not water soluble) benzoguanamine-formaldehyde condensate. A commercially available material of this type is American Cyanamid Product XM-1125.

EXAMPLE 4

Preparation of Soluble Urethane Resin Based on Styrene-Allyl Alcohol Polyol

Parts by Weight
1800 Styrene-Allyl Alcohol Copolymer containing 5.2 hydroxy groups per mol (see note 2)
450 Tung Oil Fatty Acids
450 Tall Oil Fatty Acids
20 Antioxidant (2,6-di-tertiary butyl-4 methyl phenol)
60 Xylol Charge the foregoing into a reactor and heat to 195° C. using light nitrogen sparge. Collect water in Dean-Stark trap (62 cc. water). Hold for an acid value of 5 to 6. Blow off xylol using nitrogen sparge and cool to 100° C. 550 Methyl Ethyl Ketone—Add solvent and check viscosity (36 poises)
1 Dibutyl Tin Oxide—Add tin catalyst
40 Toluene diisocyanate—Add diisocyanate over a 15 minute period. Hold for one hour at 100°–105° C. Check viscosity (130 poises).
105 Trimellitic Anhydride—Add anhydride and hold for 2 hours at 100°–105° C.
450 Methyl Ethyl Ketone—Add solvent to adjust solids to 72 percent.
30 Triethyl Amine—Add amine.
60 Butylene Oxide—Add butylene oxide over a 20 minute period and hold for an acid value of 24–25.

The final characteristics of the polymer solution are as follows:

| | |
|---|---|
| Solids | 73.5% |
| Viscosity | X–Y |
| Acid Value | 25.0 |

Note 2 The styrene-allyl alcohol copolymer has the following characteristics

| | |
|---|---|
| Average equivalent weight | 220 |
| Average number of hydroxyl groups per mole | 5.2 |
| Average molecular weight | 1,150 |
| Softening point | 97° C. |
| Hydroxyl Value | 0.45 equivalents of hydroxy per 100 grams of polyol |

The polymer solution of example 4 was blended with 25 percent by weight of hexamethoxy methyl-melamine. Films of the above coatings were drawn on steel panels and baked for 20 minutes at 350° F. The thickness of the films was 1 mil.

The following results were obtained:

| | |
|---|---|
| Adhesion to metal | Excellent |
| Pencil hardness | 4H–5H |
| Forward impact (in./lbs.) | 80 |
| Flexibility (conical mandrel) | Pass 1/8 inches |
| Toluol resistance | Excellent |
| Recoat adhesion | Excellent |

The above results indicate that the coatings prepared utilizing urethane resins based on allyl alcohol copolymers modified by the instant invention possess excellent cure, hardness, flexibility and adhesion properties.

The invention is defined in the claims which follow.

I claim:

1. A polyurethane resin dispersible in water with the aid of a base produced by reacting a resinous polyol of relatively low molecular weight with a stoichiometric deficiency of organic polyisocyanate in a ratio of hydroxy to isocyanate of from 2:1 to 50:1 to provide an hydroxy-functional polyurethane, said polyurethane including carboxyl groups generated by reaction of the hydroxy functionality of said polyurethane with polycarboxylic monoanhydride, a portion of said carboxyl groups being reacted with monoepoxide free of functional groups which would interfere with the reaction between the carboxyl groups and the monoepoxide to provide hydroxy groups remote from the backbone of said polyurethane.

2. A polyurethane resin as recited in claim 1 in which said carboxyl groups are generated by reacting a portion of the hydroxy groups provided by said polyol with polycarboxylic acid monoanhydride.

3. A polyurethane resin as recited in claim 2 in which said resinous polyol is provided by reacting a resinous polyepoxide with a stoichiometric proportion of monocarboxylic acid.

4. A polyurethane resin as recited in claim 3 in which said monocarboxylic acid is a frosting oil fatty acid.

5. A polyurethane resin as recited in claim 1 in which said polyurethane includes carboxyl groups providing an acid number of from about 20 to about 120 and said reaction with monoepoxide lowers the acid number to below about 30.

6. A polyurethane resin as recited in claim 1 in which said resinous polyol is a bisphenol-based resinous polyepoxide having a molecular weight of about 400 to about 2,000.

7. A polyurethane resin as recited in claim 1 in which said monoepoxide is selected from the group consisting of $C_2$–$C_4$ mono-oxides and glycidyl esters of alpha-branched saturated monocarboxylic acids.

8. A polyurethane resin dispersible in water with the aid of a base producing by reacting a resinous polyol of relatively low molecular weight with an organic diisocyanate in a ratio of hydroxy to isocyanate of from 2:1 to 50:1, said polyurethane resin including carboxyl groups generated by reacting a portion of the hydroxy groups provided by said polyol with polycarboxylic acid monoanhydride to provide an acid number of from about 20 to about 120, a portion of said carboxyl groups being converted to hydroxy ester groups by reaction with monoepoxide free of functional groups which would interfere with the reaction between the carboxyl groups and the monoepoxide.

9. A polyurethane resin as recited in claim 8 in which said resinous polyol is provided by reacting a resinous polyepoxide with a stoichiometric proportion of drying oil fatty acid.

10. A polyurethane resin as recited in claim 9 in which said drying oil fatty acid is a frosting oil fatty acid and the ratio of hydroxy groups in said resinous polyol to isocyanate groups in said diisocyanate is less than 15:1.

11. An aqueous electrocoating bath comprising the polyurethane resin of claim 8 dispersed in water with the aid of a base and providing a resin solids content of from 1–20 percent by weight therein.

12. A nongelled polyurethane resin produced by reacting a resinous polyepoxide having a molecular weight in the range of from about 300 to about 4,000 with a stoichiometric proportion of frosting oil fatty acid to provide an epoxy ester polyol, said polyol being reacted with a stoichiometric deficiency of organic diisocyanate in a ratio of hydroxy to isocyanate of from 2:1 to 50:1 and with a polycarboxylic acid monoanhydride to provide an hydroxy functional polyurethane including carboxyl functionality.

13. A polyurethane resin as recited in claim 12 in which a portion of the carboxyl groups of said polyurethane are reacted with monoepoxide free of functional groups which would interfere with the reaction between the carboxyl groups and the monoepoxide to generate hydroxy ester groups.